UNITED STATES PATENT OFFICE.

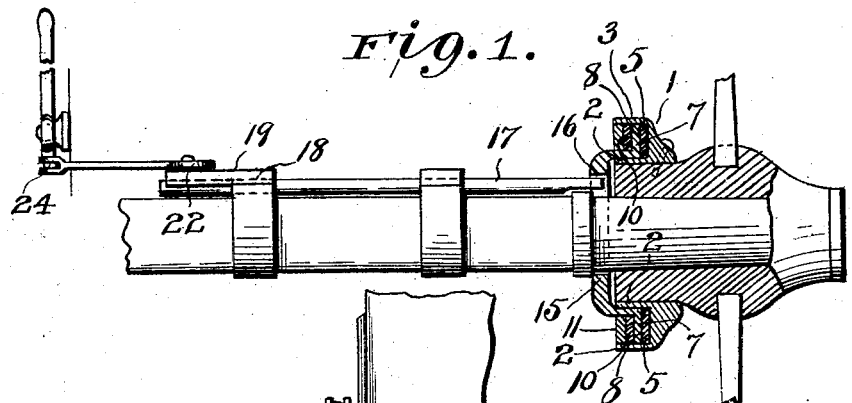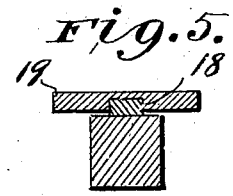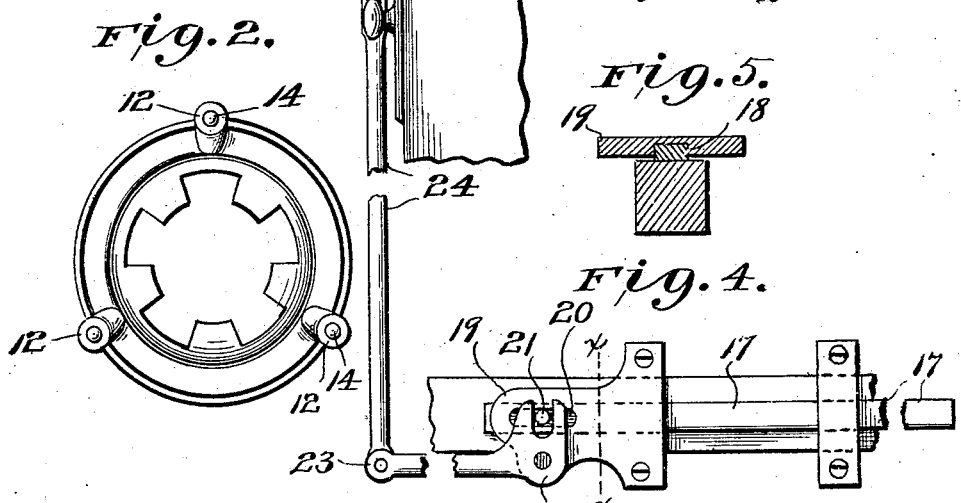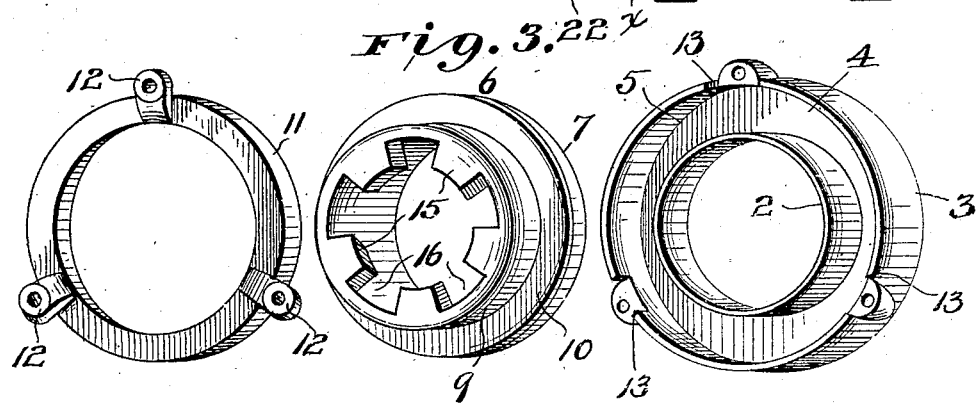

NICHOLAS J. RICE, OF MEADVILLE, PENNSYLVANIA.

VEHICLE-BRAKE.

No. 864,031.　　　　Specification of Letters Patent.　　　　Patented Aug. 20, 1907.

Application filed December 30, 1905. Serial No. 293,956.

*To all whom it may concern:*

Be it known that I, NICHOLAS J. RICE, a citizen of the United States, residing at Meadville, in the county of Crawford and State of Pennsylvania, have invented new and useful Improvements in Vehicle-Brakes, of which the following is a specification.

My invention relates to brakes for vehicles and its object is to provide a brake adapted to be applied to the hub of the vehicle and of such construction that its frictional surfaces may be contained within the hub and thus protected against sand and dirt, while at the same time an expensively constructed hub and axle are avoided, and a brake provided that may be easily operated.

To this end the invention is embodied in preferable form in the device shown in the accompanying drawings, in which Figure 1 is a side view in elevation partly in vertical section of the brake, Fig. 2 is a view looking toward the inner end of the frictional parts of the brake, Fig. 3 is a perspective view of the various frictional members of the brake separated and Fig. 4, is a detail plan of the operating slide-bar and lever therefor. Fig. 5 is a detail cross-section on line $x$—$x$ of Fig. 4.

Referring to the drawings, 1 is an annular extension of the hub of the vehicle and it is provided with an inner annular axle-bearing ring or collar 2, and an outer annular collar 3. Between these collars and in the annular chamber 4 formed thereby is seated a frictional brake surface body 5, fixed to the hub at the inner end of the chamber. This frictional body is preferably formed of raw hide, although any other suitable yielding frictional material may be employed. Adapted to enter the chamber 4 is a main brake member 6 which is provided with an outer annular ring 7 having a flat surface 8 on the side towards the outer end of the hub, which surface is adapted to bear against the frictional body 5. The member 6, is also provided with a horizontally extending collar 9. On the inner face of the annular ring 7 there is provided a ring or annular body of frictional material 10 preferably of raw hide or similar material and adapted to constitute the second of the double frictional braking faces of the brake. The collar 9 is adapted to be surrounded by a ring 11 when the parts are assembled, which ring serves to fit within and fill the inner end of the annular chamber 4 of the hub. The outer face of this ring, looking toward the outer end of the hub provides a braking surface against which the frictional body 10 bears. The ring 11 enters within the outer edge of the collar 3 of the hub and is provided at intervals with lugs 12 which enter into and engage recesses 13 formed in the inner peripheral edge of the hub. The lugs 12 are provided with screw holes adapted to receive set screws 14 engaging the hub whereby
the amount of pressure exerted by the braking member 6 against the hub and the hub ring may be determined by the adjustment of these screws.

The main braking member 6 at the inner edge of the collar 9 is provided with radially extending teeth or projections 15 forming between them recesses 16. Adapted to be projected within these recesses in order to stop the rotation of the brake member 6 is a slide-bar 17 slidably mounted in a guideway 18 formed in a bracket 19 which is suitably secured to the axle or which may be secured to any other suitable part of the frame of the vehicle. The bracket 19 is provided at its inner end with a slot 20 through which is adapted to project a pin 21 carried by the slide bar 17. Engaging this pin is the forked end of a lever 22 pivoted on the bracket and provided at its other end 23 with a lever 24 or any suitable operating means adapted to extend within convenient reach of the driver of the vehicle, so as to provide a handle for the operation of the brake. The operation of the brake is as follows:—

Normally the main brake member 6 revolves with the hub owing to the pressure against said brake member by the hub and the inner brake ring 11. But when it is desired to apply the brake the lever 22 is operated by the driver so as to slide inward the slide-bar 17 the end of which will thereupon be projected into one of the recesses 16 and hence instantly stop the rotation of the brake member 6; whereupon the hub will be forced to revolve against the frictional pressure of the two brake surfaces formed by the frictional bodies 5 and 8. It has been found upon experience that these frictional bodies will stand the wear of brake pressure for the period of several months without adjustment. When, however, it is desired to take up the wear or to increase the braking power it is merely necessary to screw up the set screws 14 so as to clamp the annular ring 11 more tightly against the inner brake surface of the brake member 6.

It is clear that with a brake constructed and arranged as above described very little alteration of the hub of the ordinary vehicle is required and the brake parts being contained within the outer collar of the hub and the space formed by said collar being tightly closed by the annular pressure ring 11 the entrance of dirt and sand such as in most cases tend to rapidly destroy the contacting brake surfaces is almost wholly prevented. The braking power can be applied instantaneously no matter at what speed the vehicle may be traveling and since the braking action is accomplished by a part separated from the wheel hub and the axle the wheel is left free in its action on the axle.

Having thus described my invention what I claim is:

1. In a brake for vehicles, the combination with the wheel hub of annular collars forming a chamber and frictional braking members inclosed within said chamber, said brake members normally rotatable with the hub and means to stop the rotation of one of said members to effect a braking action, substantially as described.

2. In a brake for vehicles in combination with the hub, a frictional brake surface on the interior of said hub, a main braking member having an annular face adapted to contact with said hub brake surface, said brake member also having a frictional annular surface and an adjustable ring engaging the hub and adapted to bear against said frictional surface carried by the said brake member, substantially as described.

3. In a brake for vehicles, in combination with a vehicle hub, said hub having an annular collar, a plane circumferential frictional surface on the hub, a braking member inclosed within said collar and adapted to make braking contact with said frictional surface, said braking member normally rotatable with the hub, means to stop its rotation, an annular ring fixed to the end of said collar and closing the end of the chamber formed thereby, said ring having a plane frictional surface adapted to contact with said braking member, and means to adjust said ring laterally whereby the braking pressure may be regulated, substantially as described.

4. In a brake for vehicles, in combination with a vehicle hub, said braking member loosely mounted on the hub but normally rotatable therewith, said member provided with frictional faces adapted to exert a braking pressure on said hub, and provided with radial recesses, and a sliding bar adapted to be projected longitudinally of the axle into one of said recesses to stop the rotation of said member and apply the braking action, substantially as described.

5. In a brake for vehicles, in combination with a vehicle hub, a collar formed in said hub and extending inwardly in respect to the axle, said hub provided with a fixed frictional braking surface at one end of the chamber formed by the collar and with an adjustable frictional surface member at the other end of said chamber, a braking member between said surfaces loosely mounted on the hub but normally rotative therewith, said member having recesses in its inner circumference, a bar slidable longitudinally of the axle and adapted to enter said recesses, and a lever for sliding said bar, substantially as described.

In testimony whereof I affix my signature, in presence of two subscribing witnesses.

NICHOLAS J. RICE.

Witnesses:
MARGARET A. HANK,
OTTO A. STOLZ.